United States Patent
Grabbe

(10) Patent No.: US 7,535,420 B2
(45) Date of Patent: May 19, 2009

(54) METHOD AND APPARATUS FOR SIGNAL TRACKING UTILIZING UNIVERSAL ALGORITHM

(75) Inventor: Michael T. Grabbe, Wylie, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 0 days.

(21) Appl. No.: 11/446,670

(22) Filed: Jun. 5, 2006

(65) Prior Publication Data

US 2007/0146204 A1    Jun. 28, 2007

Related U.S. Application Data

(63) Continuation-in-part of application No. 11/316,298, filed on Dec. 22, 2005.

(51) Int. Cl.
*G01S 3/02* (2006.01)

(52) U.S. Cl. .................. 342/465; 342/451; 342/461

(58) Field of Classification Search ........... 342/387, 342/357.01–358, 450–465; 701/213–216
See application file for complete search history.

(56) References Cited

U.S. PATENT DOCUMENTS

| | | | |
|---|---|---|---|
| 4,797,679 A | 1/1989 | Cusdin et al. | |
| 5,075,694 A * | 12/1991 | Donnangelo et al. | 342/455 |
| 5,914,687 A | 6/1999 | Rose | |
| 6,307,505 B1 * | 10/2001 | Green | 342/357.09 |
| 6,401,036 B1 | 6/2002 | Geier et al. | |
| 6,407,703 B1 * | 6/2002 | Minter et al. | 342/465 |
| 6,522,890 B2 | 2/2003 | Drane et al. | |
| 6,608,589 B1 | 8/2003 | Devereux et al. | |
| 6,760,664 B1 * | 7/2004 | Julie et al. | 701/214 |
| 6,798,381 B2 * | 9/2004 | Benner et al. | 342/451 |
| 6,856,903 B2 | 2/2005 | Ishigami et al. | |
| 6,920,329 B2 | 7/2005 | Kennedy et al. | |
| 6,933,888 B1 | 8/2005 | Shiffmiller et al. | |
| 6,944,465 B2 | 9/2005 | Spain et al. | |
| 7,181,323 B1 * | 2/2007 | Boka et al. | 701/1 |
| 2002/0094824 A1 | 7/2002 | Kennedy et al. | |
| 2002/0198657 A1 * | 12/2002 | Robbins | 701/214 |
| 2003/0043073 A1 | 3/2003 | Gray et al. | |
| 2003/0052821 A1 | 3/2003 | Holt | |
| 2004/0073360 A1 * | 4/2004 | Foxlin | 701/207 |
| 2004/0085242 A1 * | 5/2004 | Brousseau et al. | 342/387 |

(Continued)

OTHER PUBLICATIONS

M. Najar et al., Kalman Tracking for UMTS mobile location, IST Mobile Summit 2001, Sep. 2001.*

(Continued)

*Primary Examiner*—Thomas H Tarcza
*Assistant Examiner*—Fred H Mull
(74) *Attorney, Agent, or Firm*—Hovey Williams LLP

(57) ABSTRACT

Embodiments of the present invention provide a method and apparatus for signal tracking utilizing a universal algorithm. The method and apparatus generally include acquiring a signal measurement corresponding to a signal emitted from an emitter, forming a measurement matrix utilizing the acquired signal measurement, and applying the measurement matrix to a recursive filter to determine a velocity and/or geolocation of the signal emitter. Such a configuration enables velocities and geolocations to be determined utilizing any signal measurement or combination of signal measurements to eliminate the need to rely on a particular static combination of signal measurements.

24 Claims, 5 Drawing Sheets

U.S. PATENT DOCUMENTS

| | | | |
|---|---|---|---|
| 2005/0046608 A1* | 3/2005 | Schantz et al. | 342/127 |
| 2005/0164712 A1 | 7/2005 | Kennedy et al. | |
| 2005/0190103 A1* | 9/2005 | Rapoport et al. | 342/357.04 |
| 2005/0226201 A1* | 10/2005 | McMillin | 370/348 |
| 2005/0282540 A1 | 12/2005 | Motamedi et al. | |
| 2006/0009240 A1* | 1/2006 | Katz | 455/457 |
| 2006/0125695 A1 | 6/2006 | Kennedy et al. | |
| 2006/0195262 A1* | 8/2006 | Draganov | 701/214 |
| 2007/0024500 A1* | 2/2007 | Glennon et al. | 342/357.12 |
| 2007/0124077 A1* | 5/2007 | Hedlund | 701/300 |

OTHER PUBLICATIONS

M.S. Grewal et al., Kalman Filtering: Theory and Practice, Using MATLAB, Second Edition, John Wiley & Sons, Inc., p. 21 and 121, 2001.*

Poisel, Richard A. *Electronic Warfare Target Location Methods.* Artech House, Inc. 2005; Norwood, Massachusetts: pp. 66-70.

Kalman Filter at http://en.wikipedia.org/wiki/Kalman_filtering; Accessed and printed out Dec. 22, 2005 (15 pages).

The Kalman Filter at http://www.cs.unc.edu/~welch/kalman; Accessed and printed out Dec. 22, 2005 (5 pages).

Mull, Fred; Office Action dated Aug. 1, 2007; U.S. Appl. No. 11/316,298.

Mull, Fred; Office Action dated Jul. 31, 2007; U.S. Appl. No. 11/446,760.

Liu, Harry K.; Office Action dated Aug. 6, 2007; U.S. Appl. No. 11/316,299.

Office Action; Author: Mull, Fred; Date: Oct. 18, 2007; U.S. Appl. No. 11/316,298.

* cited by examiner

METHOD AND APPARATUS FOR SIGNAL TRACKING UTILIZING UNIVERSAL ALGORITHM

RELATED APPLICATIONS

The present application is a continuation-in-part and claims priority benefit, with regard to all common subject matter, of an earlier-filed U.S. patent application titled "METHOD AND APPARATUS FOR SIGNAL TRACKING UTILIZING UNIVERSAL ALGORITHM", Ser. No. 11/316,298, filed Dec. 22, 2005. The identified earlier-filed application is hereby incorporated by reference into the present application.

COMPUTER PROGRAM LISTING APPENDIX

A computer program listing appendix containing the source code of a computer program that may be used with the present invention is incorporated herein by reference and appended hereto as one (1) original compact disc, and an identical copy thereof, containing a total of 34 files as follows:

| Date of Creation | Size (Bytes) | Filename |
| --- | --- | --- |
| May 3, 2006 | 603 | compute_stay_point_enu.m |
| May 3, 2006 | 666 | construct_ellipse.m |
| May 3, 2006 | 2,119 | conversions.m |
| May 3, 2006 | 2,946 | create_dted2.m |
| May 3, 2006 | 621 | ecef_to_gnomonic_enu.m |
| May 3, 2006 | 1,824 | ecef_to_latlonalt.m |
| May 3, 2006 | 1,139 | ellipse_components.m |
| May 3, 2006 | 679 | ellipse_to_matrix_enu.m |
| May 3, 2006 | 406 | euler_to_matrix.m |
| May 3, 2006 | 415 | flight.m |
| May 3, 2006 | 439 | flight_dyn.m |
| May 3, 2006 | 3,677 | gauss_markov_init_enu.m |
| May 3, 2006 | 807 | gnomonic_to_ecef_enu.m |
| May 3, 2006 | 913 | gradient_grabbe.m |
| May 3, 2006 | 5,888 | inputs.m |
| May 3, 2006 | 450 | interp_dted.m |
| May 3, 2006 | 1,290 | kalman_init_enu.m |
| May 3, 2006 | 505 | latlonalt_to_ecef.m |
| May 3, 2006 | 503 | measured_doa_enu.m |
| May 3, 2006 | 1,253 | measured_doa_gp_enu.m |
| May 3, 2006 | 2,167 | measured_position_enu.m |
| May 3, 2006 | 2,249 | plot_dted.m |
| May 3, 2006 | 1,705 | plot_ellipse_kalman.m |
| May 3, 2006 | 2,507 | plot_flights_enu.m |
| May 3, 2006 | 817 | rngbng_to_latlon.m |
| May 3, 2006 | 19,061 | tct_geo.m |
| May 3, 2006 | 9,087 | tct_kalman.m |
| May 3, 2006 | 21,215 | tracking.m |
| May 3, 2006 | 1,412 | tracking_conversions.m |
| May 3, 2006 | 4,231 | tracking_inputs.m |
| May 3, 2006 | 9,354 | tracking_kalman.m |
| May 3, 2006 | 7,405 | tracking_plots.m |
| May 3, 2006 | 1,583 | tracking_update.m |
| May 3, 2006 | 562 | wgs84_model.m |

BACKGROUND OF THE INVENTION

1. Field of the Invention

The present invention relates to signal tracking. More particularly, the invention relates to a method and apparatus for signal tracking that utilizes a universal algorithm to determine a geolocation and/or a velocity based on one or more signal measurements.

2. Description of the Related Art

The ability to determine the source geolocation and velocity of emitted signals is becoming increasingly important as the use of wireless communications devices becomes commonplace throughout the world. For example, the U.S. Federal Communications Commission Enhanced 911 (E911) rules will eventually require cellular telephone carriers to identify the geolocations, i.e. the physical source locations, of subscribers who place calls to 911. Additionally, wireless communication device users often desire to acquire accurate geolocations and velocities for navigation purposes, such as to generate a route between a current location and a destination. Further, military and law enforcement agencies often desire to locate sources and velocities of emitted signals for tracking and targeting purposes.

Methods and devices have been developed that enable signal geolocations to be determined. Some of these methods include utilizing Global Position System (GPS) elements that must be coupled with signal emitters to determine geolocations, thereby increasing system cost and complexity. Other methods include utilizing one or more collector elements, such as antennas, to generate signal measurements and compute geolocations utilizing the generated signal measurements.

Although utilizing signal measurements enables geolocations and velocities to be determined without physically interfacing with signal emitters, such methods generally require specific and static measurement types and are incompatible across multiple or varying platforms. For example, if a signal measurement system is configured to determine a geolocation or velocity utilizing an angle of arrival, it will be inoperable to utilize another signal measurement, such as a time difference of arrival, to determine the geolocation. Thus, signal measurement methods and related systems are often crippled due to configuration and/or system changes that affect available measurement types.

Additionally, developed signal measurement methods and related systems generally require at least a pair of measurements, such as both an angle of arrival and a frequency difference of arrival, to compute a geolocation. As a result, such methods and systems are unable to utilize a single measurement to accurately reflect a geolocation or utilize one or more measurements to accurately update a previously determined geolocation. Thus, the ability to accurately determine signal geolocations and velocities is often limited due to the lack of functionality of developed methods and systems.

SUMMARY OF THE INVENTION

The present invention solves the above-described problems and provides a distinct advance in the art of signal tracking. More particularly, the invention provides a method and apparatus for signal tracking that utilizes a universal algorithm to determine a geolocation and/or a velocity based on one or more signal measurements. Utilization of a universal algorithm enables geolocations and velocities to be determined utilizing any signal measurement or combination of signal measurements to eliminate the need to rely on a particular static combination of signal measurements.

In one embodiment, the present invention provides a method of determining a velocity of a signal emitter. The method generally includes acquiring a signal measurement corresponding to a signal emitted from the emitter, forming a measurement matrix utilizing the acquired signal measurement, and applying the measurement matrix to a recursive filter to determine a velocity of the emitter. The method may also determine a geolocation of the emitter.

In another embodiment, the method includes acquiring a signal measurement corresponding to a signal emitted from the signal emitter and ascertaining the validity of the acquired signal measurement. If the acquired signal measurement is valid, the method includes forming a measurement matrix utilizing the acquired signal measurement and applying the measurement matrix to a recursive filter to determine a velocity and a geolocation of the signal emitter. The method may further include acquiring a second signal measurement corresponding to the signal, forming a second measurement matrix utilizing the second signal measurement, and applying the second measurement matrix to the recursive filter to update the determined velocity and geolocation.

In another embodiment, the present invention provides a computer program for determining a velocity of a signal emitter. The computer program comprises a plurality of code segments operable to acquire a signal measurement corresponding to a signal emitted from the emitter, form a measurement matrix utilizing the acquired signal measurement, and apply the measurement matrix to a recursive filter to determine a velocity of the emitter.

In another embodiment, the present invention provides a computing element operable to determine a velocity of a signal emitter. The computing element includes a memory and a processor coupled with the memory. The memory is operable to store a signal measurement corresponding to a signal emitted from the emitter and the processor is operable to form a measurement matrix utilizing the acquired signal measurement and apply the measurement matrix to a recursive filter to determine a velocity of the signal emitter.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
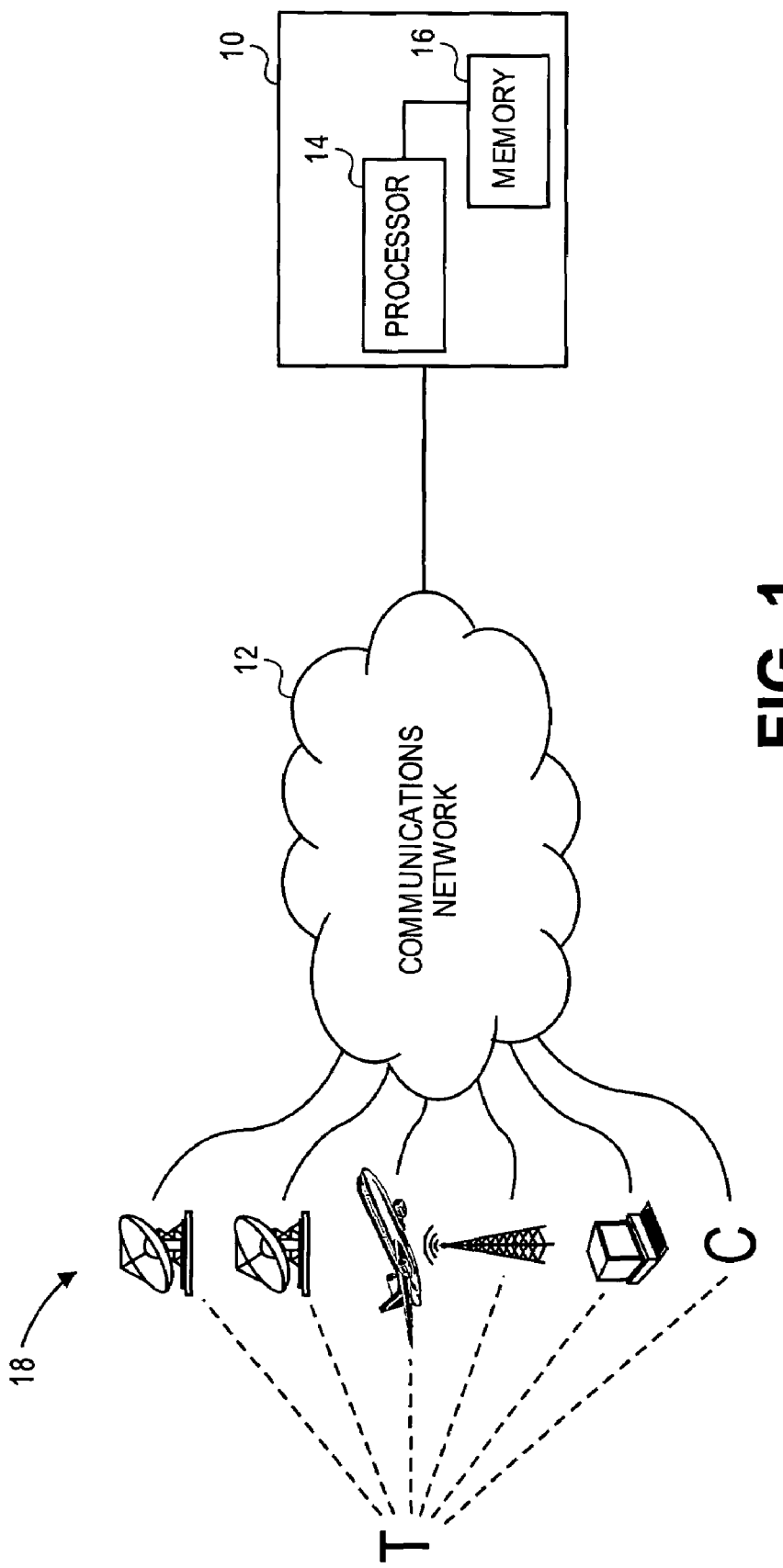
FIG. 1 is a block diagram of some of the elements operable to be utilized by various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Methods consistent with the present teachings are especially well-suited for implementation by a computing element 10, as illustrated in FIG. 1. The computing element 10 may be a part of a communications network 12 that enables various devices to exchange information and data. The computing element 10 may include a processor 14 coupled with a memory 16 to perform the various functions described herein. As should be appreciated, the processor 14 and memory 16 may be integral or discrete and comprise various conventional devices, such as microcontrollers, microprocessors, programmable logic devices, etc. Further, the computing element 10 may include additional devices, such as a display for indicating processed information, such as a geolocation, or additionally processing and memory elements. Further, the computing element 10 may comprise a plurality of computing elements or a network of computing elements such that one or more portions of the invention are implemented utilizing a first computing element and one or more other portions of the invention are implemented utilizing a second computing element.

The present invention can be implemented in hardware, software, firmware, or combinations thereof. In a preferred embodiment, however, the invention is implemented with a computer program. The computer program and equipment described herein are merely examples of a program and equipment that may be used to implement the present invention and may be replaced with other software and computer equipment without departing from the scope of the present teachings. It will also be appreciated that the principles of the present invention are useful independently of a particular implementation, and that one or more of the steps described herein may be implemented without the assistance of the computing element 10.

Computer programs consistent with the present teachings can be stored in or on a computer-readable medium residing on or accessible by the computing element 10, such as the memory 16, for instructing the computing element 10 to implement the method of the present invention as described herein. The computer program preferably comprises an ordered listing of executable instructions for implementing logical functions in the computing element 10 and other computing devices coupled with the computing element 10. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by persons of ordinary skill in the art that the program may comprise a single list of executable instructions or two or more separate lists, and may be stored on a single computer-readable medium or multiple distinct media.

In the context of this application, a "computer-readable medium", including the memory 16, can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc (CD) or a digital video disc (DVD). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

As shown in FIG. 1, the computing element 10 is preferably directly or indirectly coupled with one or more collector elements 18 to enable function of the present invention as described herein. It should be appreciated the computing element 10 and the collector elements 18 may be integral such as where one or more of the collector elements 18 are operable to independently perform signal tracking as described herein. Thus, the computing element 10 and collector elements 18 need not necessarily be coupled through the communications network 12 with other devices or collector elements to enable operation of the present invention.

The collector elements 18 may include any devices or elements that are operable to detect and/or otherwise receive an emitted electromagnetic signal. Thus, the collector elements 18 may include stationary and non-stationary antennas, uni-directional and omni-directional antennas, electrical elements operable to relay a signal, etc. In various embodiments the collector elements 18 may comprise a plurality of communication towers, such as cellular-phone towers, associated via the communications network 12. Thus, the present invention is not limited to the utilization of only one type or configuration of collector elements 18.

Figure 3:
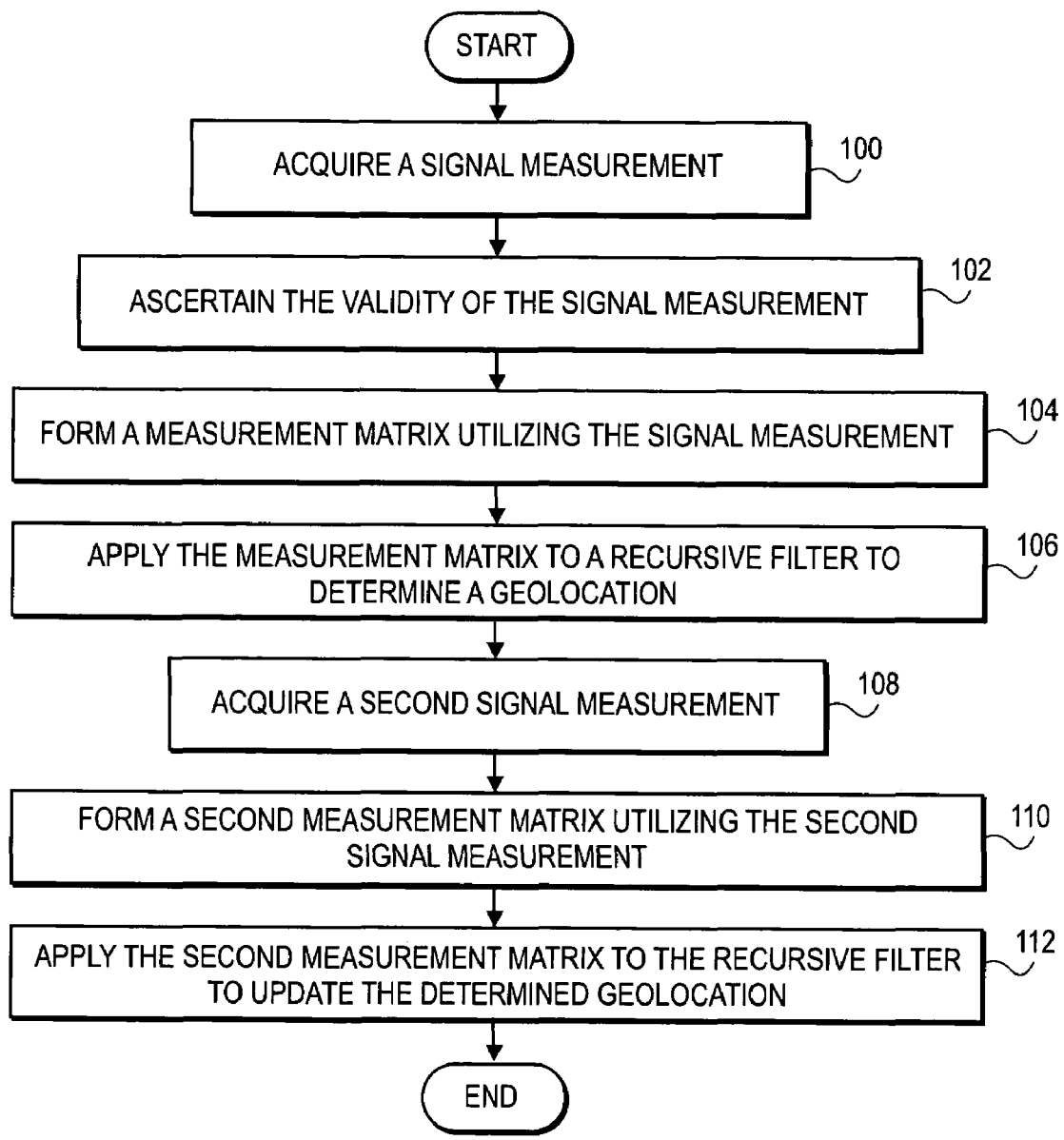
FIG. 3 is a flow chart showing some of the steps operable to be performed by the present invention.
Figure 4:
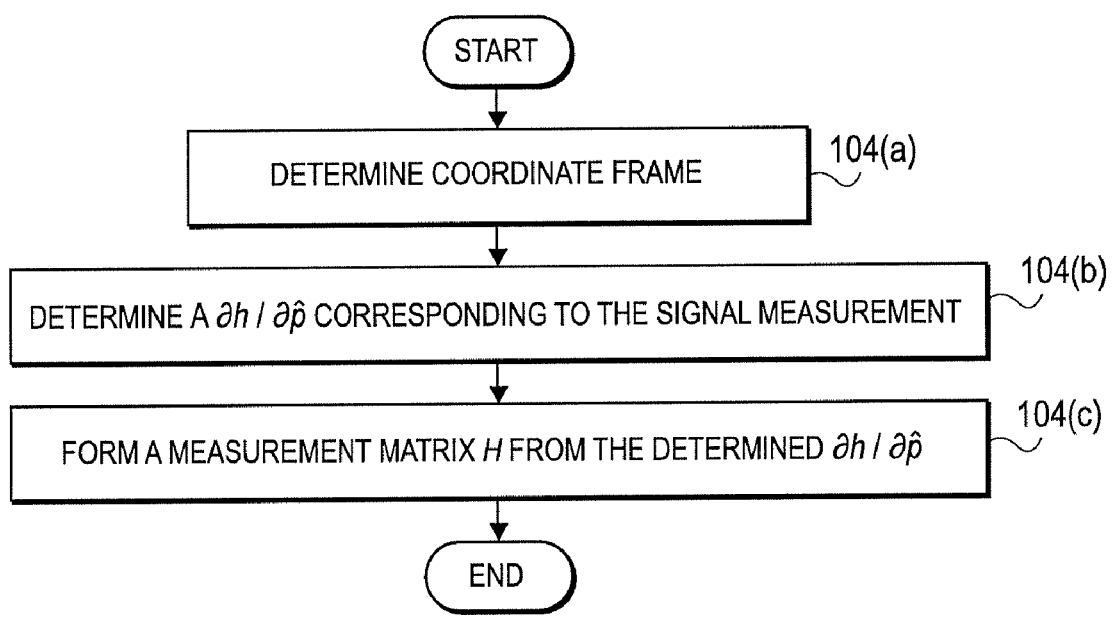
FIG. 4 is a flow chart showing some of the steps of FIG. 3 is more detail.

A flowchart of steps that may be utilized by the present invention to determine a geolocation is illustrated in FIG. 3. Some of the blocks of the flow chart may represent a module segment or portion of code of the computer program of the present invention which comprises one or more executable instructions for implementing the specified logical function or functions. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

In step 100, a signal measurement corresponding to a signal is acquired. The signal measurement may be computed by the computing element 10 utilizing information provided by one or more of the collector elements 18 and/or the signal measurement may be retrieved from the collector elements 18, computing elements, the memory 16, or any device coupled with the communications network 12.

Figure 2:
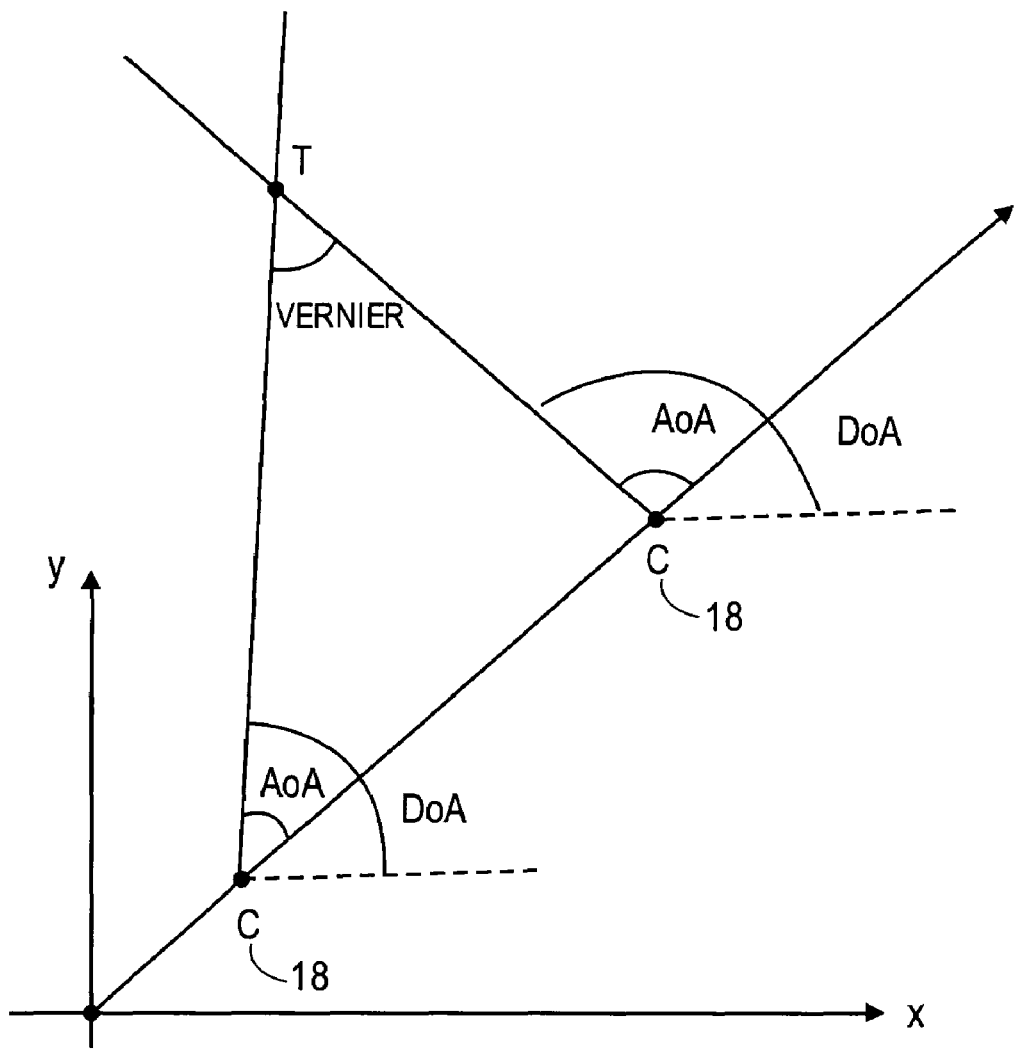
FIG. 2 is a schematic view of various angles formed between a moving collector and a signal-emitting target.

FIG. 2 provides exemplary signal measurements corresponding to a single moving collector element while FIG. 1 illustrates utilizing a plurality of collector elements to acquire a single measurement. Thus, the signal measurement may be previously computed or otherwise determined by one or more elements accessible through the communications network 12 and then retrieved for utilization with the present invention.

The signal measurement may include any measurement or characteristic corresponding to the signal, such as angle of arrival (AOA), a direction of arrival (DOA), a vernier angle, a time difference of arrival (TDOA), a frequency difference of arrival (FDOA), a target range, a position, combinations thereof, etc. Thus, step 100 is not limited to the acquisition of a particular signal measurement as the present invention may utilize any signal measurement to determine geolocation, as is described below in detail.

Such functionality is beneficial as it enables the present invention to be utilized with various devices, networks, signals, and collector elements without requiring any specific or known compatibility there between. For example, the computing element 10 may interface with a first collector element that is operable to only provide AOA and a second collector element that is operable to only provide TDOA and determine geolocation utilizing either measurement as discussed below.

In embodiments where the signal measurement is acquired by processing information utilizing the computing element 10, any conventional algorithms may be employed to determine the signal measurement from the received and/or detected signal. For example, AOA, DOA, TDOA, FDOA, etc, may be computed by measuring various signal characteristics, such as the difference in frequency or time between two collector elements or along a collector element, etc.

In step 102, the validity of the signal measurement acquired in step 100 is ascertained. The validity of the signal measurement is ascertained to determine if the signal measurement may and/or should be utilized to compute geolocation as described below. Thus, if the signal measurement is considered invalid, the present invention may repeat step 100 to acquire another signal measurement to determine geolocation. Such functionality improves the accuracy of the present invention by reducing the probability that erroneous signal measurements are utilized to compute geolocation.

The validity of the signal measurement may be ascertained utilizing various methods. For example, the signal measurement acquired in step 100 may be compared to a previously acquired signal measurement, an expected signal measurement, an estimated signal measurement, etc, to determine if the acquired signal measurement is valid. Thus, if the acquired signal measurement varies from an estimated or expected signal measurement by a significant amount, the signal measurement may be considered invalid and step 100 may be repeated.

Preferably, an innovation is computed to determine the validity of the acquired signal measurement. The computed innovation is the difference between the measured and expected values:

$$\text{innovation} = z - h(\hat{s}) \quad (1)$$

wherein z is the measured value and $h(\hat{s})$ is the expected value, discussed below in step 104 in more detail.

If the measurement is DOA angle, then the innovation should be unwrapped so that its value is between $-\pi$ and $\pi$. The variance of the error in h is $HPH^T$. The variance of the error in z is $\sigma^2$. Since these errors are assumed to be independent, the variance of the innovation is the sum $HPH^T + \sigma^2$. Since these errors are also assumed to be Gaussian, a reasonable check for the validity of the measurement z is:

$$[z-h]^T [HPH^T + \sigma^2]^{-1} [z-h] \leq \chi^2 \quad (2)$$

wherein $\chi^2$ is the appropriate critical value from a chi-square distribution. For example, if a 99% confidence level is desired for 1 degree-of-freedom, then $\chi^2 = 6.6349$. If the measurement z does not satisfy the above-equation, then the measurement acquired in step 100 may be considered invalid and the below steps may be ignored and/or step 100 may be repeated to attempt to acquire a valid or a more-valid measurement.

It should be appreciated that step 102 need not be performed in all embodiments as the measurement acquired in step 100 may be assumed valid and always utilized by the present invention. Further, step 102 may be performed or repeated at any time to ensure to the continued validity of acquired measurements.

In step 104, a measurement matrix H is formed utilizing the signal measurement. Generally, the measurement matrix H is formed by defining a coordinate frame, referenced at step 104(a), determining a ∂h/∂p-hat to correspond to the signal measurement, referenced at step 104(b), and forming the measurement matrix H from the determined ∂h/∂p-hat, referenced at step 104(c).

The measurement matrix is applied to a recursive filter, as described in step 106, to determine a geolocation of the signal corresponding to the signal measurement acquired in step 100. The measurement matrix is thus formed to correspond to the utilized recursive filter.

In various embodiments, the measurement matrix H and recursive filter may employ a coordinate model, such as the World Geodetic System of 1984 model (WGS84), to provide geolocations in a readily usable, accurate, and standardized format. In step 104(a), the coordinate frame utilized by the present invention, if any, is defined. The following matrices may be utilized to represent rotations of a coordinate frame about its x, y, and z axes:

$$R(\cdot, x) = \begin{bmatrix} 1 & 0 & 0 \\ 0 & \cos(\cdot) & -\sin(\cdot) \\ 0 & \sin(\cdot) & \cos(\cdot) \end{bmatrix} \quad (3)$$

$$R(\cdot, y) = \begin{bmatrix} \cos(\cdot) & 0 & \sin(\cdot) \\ 0 & 1 & 0 \\ -\sin(\cdot) & 0 & \cos(\cdot) \end{bmatrix}$$

$$R(\cdot, z) = \begin{bmatrix} \cos(\cdot) & -\sin(\cdot) & 0 \\ \sin(\cdot) & \cos(\cdot) & 0 \\ 0 & 0 & 1 \end{bmatrix}$$

The following rotation matrix relates the Earth Centered Earth Fixed coordinate frame (ECEF) and any local level coordinate frame:

$$TEL = R(\psi, z) \cdot R(-\theta - \pi/2, y) \quad (4)$$

wherein longitude is $\psi$ and latitude is $\theta$. The Earth's transverse radius of curvature is:

$$r_E = \frac{r_{eq}}{\sqrt{1 - \varepsilon^2 \sin^2(\theta)}} \quad (5)$$

wherein $\varepsilon = 0.08181919$ is the earth's eccentricity and $r_{eq} = 6378137$ meters is the earth's equatorial radius. Position relative to the earth's center in the ECEF coordinate frame is:

$$^E p = \begin{bmatrix} (r_E + a)\cos(\psi)\cos(\theta) \\ (r_E + a)\sin(\psi)\cos(\theta) \\ (r_E(1 - \varepsilon^2) + a)\sin(\theta) \end{bmatrix} \quad (6)$$

wherein a is the altitude above the WGS84 ellipsoid. The above equations may be utilized in combination with the recursive filter discussed below to determine geolocations in various coordinate frames, such as the WGS84 Earth Model coordinate frame. Additionally, the coordinate frame may be predefined such that step 104(a) is not necessary in all embodiments and/or the coordinate frame may be defined in combination with various other calculations such that step 104(a) need not be discretely performed.

Preferably, the recursive filter utilized by the present invention generally corresponds to a Kalman filter, such as an extended Kalman filter. The Kalman filter is a recursive filter that estimates the state of a dynamic system utilizing one or more measurements, such as the signal measurement acquired in step 100.

The utilized Kalman filter preferably includes a 2×1 state vector s, a state measurement update $\hat{s}_{new}$, a gain matrix K, and a 2×2 state estimation error covariance matrix P. The state vector s corresponds to target longitude ($\psi$) and latitude ($\theta$) and may be given by the following equation:

$$s = \begin{bmatrix} \psi \\ \theta \end{bmatrix} \quad (7)$$

The covariance matrix P is given by:

$$P = E[(s - \hat{s})(s - \hat{s})^T] \quad (8)$$

wherein $\hat{s}$ is the estimate of s and E is an expectation operator. As is known in the art, the ECEF coordinate frame has its origin at the Earth's center, with the z axis through the north pole and the x axis through the intersection of the equator and the Greenwich Meridian. As should be appreciated, other coordinate frames and models may be utilized instead of or in addition to ECEF without departing from the scope of the present invention.

The gain matrix K is given by:

$$K = PH^T[HPH^T + \sigma^2]^{-1} \quad (9)$$

wherein P is the covariance matrix, H is the measurement matrix, and $\sigma$ is a measurement error variance.

The state measurement update $\hat{s}_{new}$ is given by:

$$\hat{s}_{new} = \hat{s} + K[z - h(\hat{s})] \quad (10)$$

wherein K is the Kalman gain matrix, $\hat{s}$ is the state vector, and $h(\hat{s})$ is the expected value discussed below regarding the measurement matrix H.

The measurement matrix H generally corresponds to a partial derivative of a measurement function with respect to latitude and longitude. Thus, the measurement matrix H may be formed regardless of signal measurement type, such as AOA, DOA, FDOA, etc, provided a partial derivative may be formed from a measurement function. The expected value of the measurement value, $h(\hat{s})$, will be generally unique for each signal measurement type.

The measurement matrix, H, may be generally defined by:

$$H = \frac{\partial h}{\partial s} = \frac{\partial h}{\partial \hat{p}} \frac{\partial \hat{p}}{\partial s} \quad (11)$$

wherein p-hat and $\hat{p}$ are utilized interchangeably herein, ∂p-hat the 3×1 ECEF position target vector computed using $\hat{s}$, as is discussed below in detail. The matrix ∂h/∂p-hat is unique for each measurement type to enable the measurement matrix to correspond to any utilized measurement type. Selection and use of this matrix is discussed below in step 104(b) in more detail.

The ∂p-hat/∂s matrix is the same for all measurement types and is computed utilizing the ECEF position discussed above. The resulting equations are:

$$\frac{\partial \hat{p}}{\partial \psi} = \begin{bmatrix} -(r_E + a)\sin(\psi)\cos(\theta) + \left(\frac{\partial r_E}{\partial \psi} + \frac{\partial a}{\partial \psi}\right)\cos(\psi)\cos(\theta) \\ (r_E + a)\cos(\psi)\cos(\theta) + \left(\frac{\partial r_E}{\partial \psi} + \frac{\partial a}{\partial \psi}\right)\sin(\psi)\cos(\theta) \\ \left(\frac{\partial r_E}{\partial \psi}(1-\varepsilon^2) + \frac{\partial a}{\partial \psi}\right)\sin(\theta) \end{bmatrix} \quad (12)$$

$$\frac{\partial \hat{p}}{\partial \theta} = \begin{bmatrix} -(r_E + a)\cos(\psi)\sin(\theta) + \left(\frac{\partial r_E}{\partial \theta} + \frac{\partial a}{\partial \theta}\right)\cos(\psi)\cos(\theta) \\ -(r_E + a)\sin(\psi)\sin(\theta) + \left(\frac{\partial r_E}{\partial \theta} + \frac{\partial a}{\partial \theta}\right)\sin(\psi)\cos(\theta) \\ (r_E(1-\varepsilon^2) + a)\cos(\theta) + \left(\frac{\partial r_E}{\partial \theta}(1-\varepsilon^2) + \frac{\partial a}{\partial \theta}\right)\sin(\theta) \end{bmatrix} \quad (13)$$

$$\frac{\partial r_E}{\partial \psi} = 0 \quad (14)$$

$$\frac{\partial r_E}{\partial \theta} = \frac{r_E \varepsilon^2 \sin(\theta)\cos(\theta)}{1 - \varepsilon^2 \sin^2(\theta)} \quad (15)$$

In step 104(*b*), the ∂h/∂p-hat matrix is ascertained based upon the type of measurement signal acquired in step 100. For example, the ∂h/∂p-hat matrix will vary depending on whether the signal corresponds to AOA, DOA, TDOA, FDOA, etc. Exemplary matrices are given below that correspond to various measurement types.

In embodiments where the signal measurement corresponds to DOA angle, the required partial derivative is formed by determining the line of sight in the North-East-Down coordinate frame given by:

$$d = TLE \cdot [\hat{p} - p] \quad (16)$$

wherein $TLE = TEL^T$ as defined above and p-hat is the ECEF position vector. Utilizing d, the expected DOA measurement is:

$$h(\hat{s}) = \tan^{-1}\left(\frac{d_y}{d_x}\right) \quad (17)$$

which provides the desired partial derivative:

$$\frac{\partial h}{\partial \hat{p}} = \frac{\partial h}{\partial d} \frac{\partial d}{\partial \hat{p}} = \left(\frac{1}{d_x^2 + d_y^2}\right)[-d_y \quad d_x \quad 0] \cdot TLE \quad (18)$$

In embodiments where the signal measurement corresponds to a Vernier angle, projections of line-of-sight on the xy plane are formed utilized ECEF position vectors $p_1$ and $p_2$:

$$d_1 = M \cdot TLE \cdot [\hat{p} - p_1] \quad (19)$$
$$d_2 = M \cdot TLE \cdot [\hat{p} - p_2]$$

$$M = \begin{bmatrix} 1 & 0 & 0 \\ 0 & 1 & 0 \\ 0 & 0 & 0 \end{bmatrix} \quad (20)$$

The resulting unit vectors along the projected line of sight are:

$$u_1 = \left(\frac{1}{\|d_1\|}\right) d_1 \quad (21)$$

$$u_2 = \left(\frac{1}{\|d_2\|}\right) d_2$$

The expected vernier angle is the angle between the projected lines-of-sight:

$$h(\hat{s}) = \cos^{-1}(u_1^T u_2) \quad (22)$$

Thus, the desired partial derivative is formed by:

$$\cos(h) = u_1^T u_2 \quad (23)$$

$$\frac{\partial h}{\partial \hat{p}} = \frac{\partial h}{\partial \cos(h)} \frac{\partial \cos(h)}{\partial \hat{p}} \quad (24)$$

$$= -\frac{1}{\sin(h)} \frac{\partial (u_1^T u_2)}{\partial \hat{p}}$$

$$= -\frac{1}{\sqrt{1 - (u_1^T u_2)^2}} \frac{\partial (u_1^T u_2)}{\partial \hat{p}}$$

$$\frac{\partial (u_1^T u_2)}{\partial \hat{p}} = u_2^T \left(\frac{\partial u_1}{\partial \hat{p}}\right) + u_1^T \left(\frac{\partial u_2}{\partial \hat{p}}\right) \quad (25)$$

$$= u_2^T \left(\frac{\partial u_1}{\partial d_1} \frac{\partial d_1}{\partial \hat{p}}\right) + u_1^T \left(\frac{\partial u_2}{\partial d_2} \frac{\partial d_2}{\partial \hat{p}}\right)$$

$$\frac{\partial d_1}{\partial \hat{p}} = \frac{\partial d_2}{\partial \hat{p}} = M \cdot TLE \quad (26)$$

$$\frac{\partial u_1}{\partial d_1} = \left(\frac{1}{\|d_1\|}\right)[I - u_1 u_1^T] \quad (27)$$

$$\frac{\partial u_2}{\partial d_2} = \left(\frac{1}{\|d_2\|}\right)[I - u_2 u_2^T]$$

$$\frac{\partial h}{\partial \hat{p}} = -\left(\frac{1}{\|d_1\| \cdot \|d_2\| \cdot \sqrt{1 - (u_1^T u_2)^2}}\right)[d_2^T [I - u_1 u_1^T] + \quad (28)$$

$$d_1^T [I - u_2 u_2^T]] \cdot M \cdot TLE$$

In embodiments where the signal measurement corresponds to TDOA, ranges corresponding to ECEF position vectors are utilized to form both the expected TDOA measurement and the desired partial derivative:

$$r_1 = \|\hat{p} - p_1\| \quad (29)$$
$$r_2 = \|\hat{p} - p_2\|$$

$$h(\hat{s}) = r_1 - r_2 \quad (30)$$

$$\frac{\partial h}{\partial \hat{p}} = \left(\frac{1}{r_1}\right)[\hat{p} - p_1]^T - \left(\frac{1}{r_2}\right)[\hat{p} - p_2]^T \quad (31)$$

In embodiments where the signal measurement corresponds to FDOA, ranges corresponding to ECEF position vectors, as defined above, and ECEF velocities are utilized to form both the expected FDOA measurement and the desired partial derivative:

$$\dot{r}_1 = -\left(\frac{1}{r_1}\right)[\hat{p} - p_1]^T \dot{p}_1 \qquad (32)$$

$$\dot{r}_2 = -\left(\frac{1}{r_2}\right)[\hat{p} - p_2]^T \dot{p}_2$$

$$h(\hat{s}) = \dot{r}_1 - \dot{r}_2 \qquad (33)$$

$$\frac{\partial h}{\partial \hat{p}} = \left(\frac{1}{r_1}\right)\left[\dot{p}_1^T + \left(\frac{\dot{r}_1}{r_1}\right)[\hat{p} - p_1]\right]^T + \qquad (34)$$
$$\left(\frac{1}{r_2}\right)\left[\dot{p}_2^T\left(\frac{\dot{r}_2}{r_2}\right)[\hat{p} - p_2]\right]^T$$

In embodiments where the signal measurement corresponds to range, an ECEF position vector is utilized to form both the expected range and the desired partial derivative:

$$h(\hat{s}) = \|\hat{p} - p\| \qquad (35)$$

$$\frac{\partial h}{\partial \hat{p}} = \left(\frac{1}{\|\hat{p} - p\|}\right)[\hat{p} - p]^T \qquad (36)$$

In embodiments where the signal measurement corresponds to position (latitude and longitude), the expected position measurement is simply:

$$h(\hat{s}) = \hat{s} \qquad (37)$$

such that it is not necessary to compute the desired partial derivative as:

$$H = \frac{\partial h}{\partial s} = I \qquad (38)$$

wherein I is the 2×2 identity matrix.

As should be appreciated by those skilled in the art, the equations given above regarding the measurement matrix H and associated partial derivatives are merely examples of equations and any equation may be utilized by the present invention to form the measurement matrix by generating a partial derivative of a measurement function with respect to latitude and longitude. Thus, the measurement matrix H and associated equations are not limited to DOA, Vernier angle, TDOA, FDOA, range, and position.

In step 106, the measurement matrix H formed in step 104 is applied to the recursive filter to determine the geolocation of the signal. Specifically, the measurement matrix H may be utilized in combination with one or more of the above-equations to determine a geolocation. As should be appreciated, the measurement matrix H may be applied to the recursive filter in innumerable configurations to compute the desired geolocation.

Due to its recursive nature, the recursive filter is preferably initialized utilizing an initial state vector ŝ and an initial covariance matrix P. The initial vectors and matrices may be acquired or ascertained through any source, including by retrieval through the communications network 12 and/or by retrieval from another computing element or collector element. However, the initial vectors and matrices may be computed utilizing the signal measurement acquired in step 100 and/or by utilizing additional signal measurements. For example, utilizing two DOA measurements, the follow initial covariance matrix may be given by a Gauss-Markov estimate:

$$P = \left[\left(\frac{1}{\sigma_1^2}\right)[H_1^T H_1] + \left(\frac{1}{\sigma_2^2}\right)[H_2^T H_2]\right]^{-1} \qquad (39)$$

wherein $\sigma_1$ and $\sigma^2$ are measurement error variances associated with the DOA measurements and $H_1$ and $H_2$ are two measurement matrices constructed in a similar manner to the measurement matrix of step 104. As will be appreciated by those skilled in the art, initialization is not necessarily required in all embodiments as the present invention may function without first initializing the recursive filter utilizing equation 39. For instance, the recursive filter may be previously initialized, the initial covariance matrix may be retrieved from the memory 16 or through the communications network 16, and/or the initialization or initial covariance matrix may be computed utilizing other estimations and methods.

The measurement matrix H and/or the expected measurement value h(ŝ) formed in step 104 are applied to the state vector measurement update, $\hat{s}_{new}$, and the covariance measurement update $P_{new}$ to determine the geolocation of the emitted signal. $\hat{s}_{new}$ and $P_{new}$ may be represented as:

$$\hat{s}_{new} = \hat{s} + K[z - h(\hat{s})] \qquad (10)$$

$$P_{new} = [I - KH]P \qquad (40)$$

wherein K is the Kalman gain matrix, ŝ is the state vector, h(ŝ) is the expected measurement, H is the measurement matrix, and P is the covariance matrix.

Such determination of $\hat{s}_{new}$ and $P_{new}$ updates the state vector ŝ to provide the geolocation of the emitted signal, represented in target longitude ψ and latitude θ. The determined geolocation may be stored in the memory 16 for utilizing by the processor 14, the determined geolocation may be provided to other elements through the communications network 12, and/or the geolocation may be displayed or otherwise indicated to a user.

In various embodiments the determined geolocation may include the altitude a in addition to longitude ψ and latitude θ. The altitude a may be a constant value acquired from the user or otherwise provided by the computing element 10, such that the present invention need not perform any additional computations to provide the altitude a in combination with the longitude ψ and latitude θ. Thus, in situations where the altitude a is a constant:

$$\frac{\partial a}{\partial \psi} = \frac{\partial a}{\partial \theta} = 0 \qquad (41)$$

However, the present invention may provide geolocations include non-constant altitudes to reflect variations in terrain resulting from different longitudes and latitudes. For instance, the present invention may utilized the longitude ψ and latitude θ and a look-up table or other database element to retrieve an altitude corresponding to the provided longitude ψ and latitude θ. The look-up table may include or otherwise utilize the standard Digital Terrain Elevation Data (DTED) system to retrieve altitudes based on longitudes and latitudes.

To achieve greater geolocation and altitude accuracy, the present invention preferably computes a numerical gradient utilizing DTED instead of merely retrieving a discrete altitude from a look-up table. For example, instead of retrieving a discrete altitude based on the determined longitude ψ and latitude θ, the present invention preferably computes the gradients presented in equation 41 and uses the computed gradients in equations 12-13 to provide altitude a based on the slope of the terrain surrounding the determined longitude ψ and latitude θ. Thus, differences between the determined longitude ψ and latitude θ and the actual longitude and latitude of the signal on varying terrain will not result in an a totally erroneous altitude due to use of the numerical gradients.

In step 108, a second signal measurement is acquired. The second signal measurement corresponds to the signal related to the first signal measurement and may be acquired in a similar or identical manner to the first signal measurement acquired in step 100. Additionally, the second signal measurement may be acquired generally simultaneously or concurrently with the first signal measurement such that acquisition of the second signal measurement need not occur at a later time than the first signal measurement. However, the second signal measurement may be acquired at any time, before, concurrently with, or after the first signal measurement.

The second signal measurement may include any signal measurement type, such as AOA, DOA, FDOA, TDOA, etc, and not be limited to any particular measurement type. As a result, the first and second signal measurement may correspond to any combination of signal measurement types. The second signal measurement may also be provided by a device or system independent from the device or system utilized to acquire the first signal measurement. For instance, the first signal measurement may be a first measurement type acquired from a first collector element and the second signal measurement may be a second measurement type, different than the first, acquired from a second collector element, unrelated to the first collector element. Such functionality enables the present invention to be universally utilized to determine geolocations without requiring any specific system configuration or measurement types.

In step 110, a second measurement matrix is formed utilizing the second signal measurement. The second measurement matrix is formed in a similar or identical manner to the first measurement matrix H as described above in step 104, with the exception that the second signal measurement is utilized to form the second measurement matrix instead of the first measurement matrix. Thus, the first and second measurements matrix may be similar with the first and second signal measurement are similar, such as when the signal measurements both correspond to DOA, or the measurement matrices may be different when the signal measurements are of different types, such as DOA and TDOA.

The second measurement matrix may be formed at any time after or concurrently with acquisition of the second signal measurement in step 108. Similarly, the second measurement matrix may be formed before, concurrently with, or after formation of the first measurement matrix of step 104. Thus, step 108 does not necessarily occur after step 104.

Additionally, in various embodiments step 110 may also include ascertaining the validity of the second signal measurement. The validity of the second signal measurement may be ascertained in a similar or identical manner to the manner in which the validity of the first signal measurement is ascertained in step 102. Should the second signal measurement be ascertained as invalid, step 108 may be repeated to acquire a valid or more valid signal measurement, while if the second signal measurement is valid, step 110 may be performed to generate the second measurement matrix.

In step 112, the second measurement matrix formed in step 110 is applied to the recursive filter to update the determined geolocation. Step 112 may be substantially similar or identical to step 106 with the exception that the second measurement matrix is applied to the recursive filter instead of the first measurement matrix. Thus, the second measurement matrix and/or the expected measurement value $h(\hat{s})$ formed in step 110 are applied to the state vector measurement update, $\hat{s}_{new}$ and the covariance measurement update $P_{new}$, defined above, to determine the geolocation of the emitted signal. The altitude a may be updated utilizing the second measurement matrix, in a similar manner to that described in step 106, to provide an updated geolocation comprising latitude, longitude, and altitude.

As should be appreciated, step 112 is operable to update the geolocation determined in step 106 without requiring batch-processing or other memory-intensive methods as all that is required by the present invention to determine and/or update the geolocation is storage of the state vector $\hat{s}$ and the covariance matrix P.

Thus, the present invention need not store previously determined signal measurements and it is operable to continuously update the determined geolocation over any period of time simply by acquiring a signal measurement, forming a measurement matrix, and applying the measurement matrix to the recursive filter.

Such a configuration also enables the present invention to accurately and continuously provide updated geolocations utilizing a single signal measurement as additional measurements may be utilized at any time to refresh the determined geolocation. Thus, the present invention does not require a pair of signals or other complex data to determine or update the geolocation.

Figure 5:
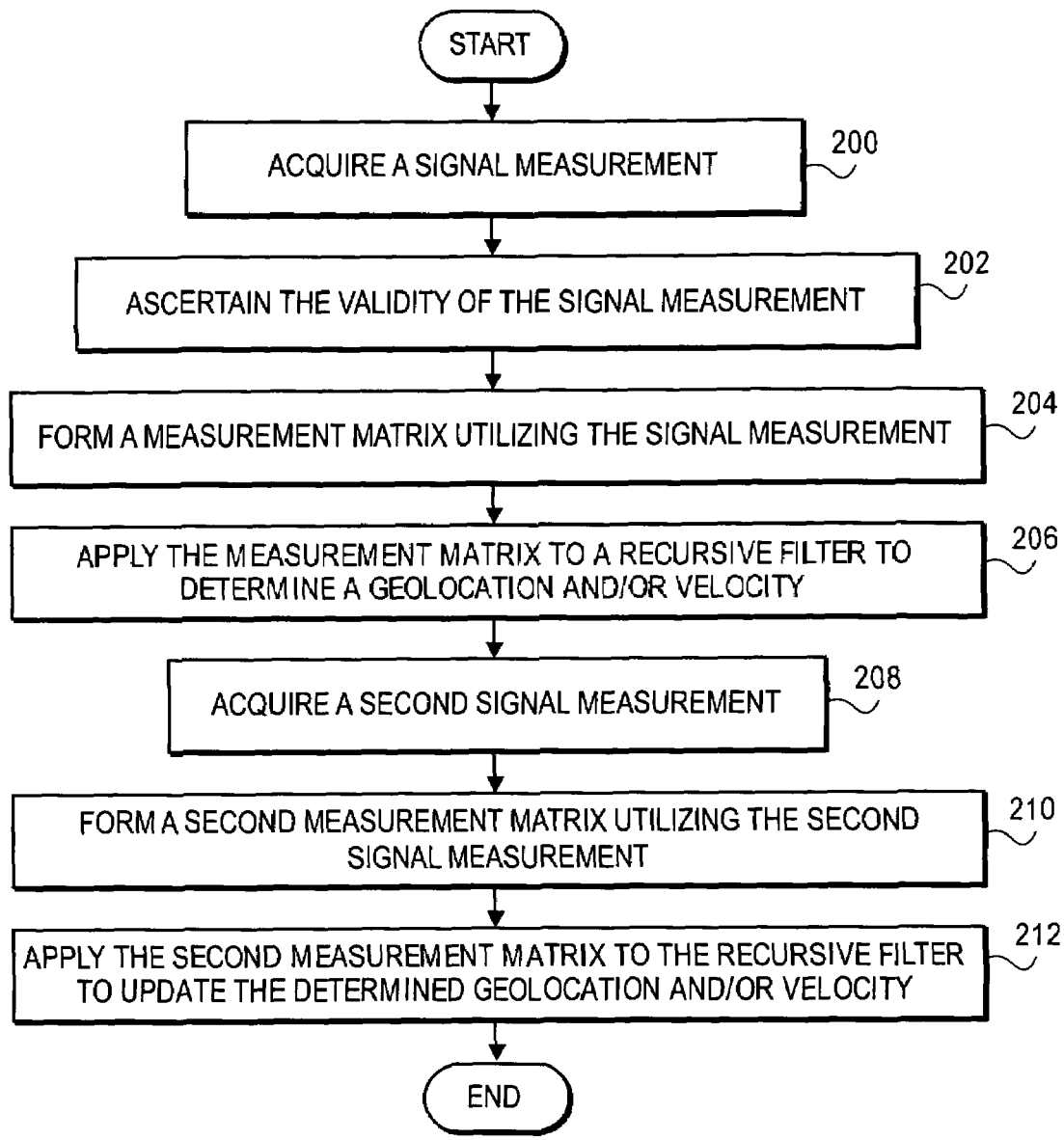
FIG. 5 is a flow chart showing some other steps that are operable to be performed by various embodiments of the present invention.

A flowchart of steps that may be utilized by the present invention in various embodiments to determine a velocity and/or a geolocation of a signal emitter is illustrated in FIG. 5. Some of the blocks of the flow chart may represent a module segment or portion of code of the computer program of the present invention which comprises one or more executable instructions for implementing the specified logical function or functions. In some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved.

In step 200, a signal measurement corresponding to a signal emitted from an emitter is acquired. Step 200 is generally similar to step 100 described above, with the exception being that the signal measurement acquired in step 200 may include an emitter velocity in addition to an angle of arrival (AOA), a direction of arrival (DOA), a time difference of arrival (TDOA), a frequency difference of arrival (FDOA), a target range, a position, combinations thereof, etc.

In step 202, the validity of the signal measurement acquired in step 200 is ascertained. Step 202 is generally similar to step 102 described above, with the exception that the measured value and $h(\hat{s})$ used to compute the innovation is determined in step 204 and not step 104.

In step 204, a measurement matrix H is formed utilizing the signal measurement acquired in step 200. Step 204 is generally similar to step 104, with the exception that step 204 requires certain additions and modifications to enable velocity to be determined in later steps. Generally, the measurement matrix H is formed in step 204 by defining a coordinate frame, determining $\partial h/\partial \hat{p}$ and a $\partial h/\partial v$ to correspond to the signal measurement, and forming the measurement matrix H from the determined $\partial h/\partial \hat{p}$ and $\partial h/\partial v$.

Equations 3 through 6, discussed above in detail, may be used to define the coordinate frame. Further, due to the desire to determine the velocity of the signal emitter, velocity relative to the coordinate frame should also be defined. Velocity relative to the Earth in frame L is given by:

$$\begin{bmatrix} v_N \\ v_E \\ v_D \end{bmatrix} = TLE \cdot {}^E\dot{p} \tag{42}$$

wherein $TLE=[TEL]^T$ and $v_N$, $v_E$, and $v_D$ represent velocity in the north, east, and down directions respectively. Longitude and latitude rates are related to velocity by the following:

$$\dot{\psi} = \frac{v_E}{\cos(\theta)(r_E + a)} \tag{43}$$

$$\dot{\theta} = \frac{v_N}{r_N + a} \tag{44}$$

Preferably, emitter velocity is assumed to be locally constant:

$$\dot{v}_N = 0$$

$$\dot{v}_E = 0 \tag{45}$$

However, it should be appreciated that emitter velocity need not be assumed to be locally constant in all embodiments of the present invention. In embodiments where emitter velocity is not assumed to be locally constant for simplification, the various equations, functions, and steps may be accordingly modified herein to reflect for non-constant local velocities.

The above equations may be utilized in combination with the recursive filter discussed below to determine geolocations and velocities in various coordinate frames, such as the WGS84 Earth Model coordinate frame. Additionally, the coordinate frame may be predefined and/or the coordinate frame may be defined in combination with various other calculations such that step 204 need not be discretely performed.

Preferably, the recursive filter utilized by the present invention generally corresponds to a Kalman filter, such as an extended Kalman filter. The Kalman filter is a recursive filter that estimates the state of a dynamic system utilizing one or more measurements, such as the signal measurement acquired in step 200.

The utilized Kalman filter preferably includes a 4×1 state vector s representing emitter position and velocity, a gain matrix K, and a 4×4 state estimation error covariance matrix P. The state vector s corresponds to target longitude ($\psi$), latitude ($\theta$), north velocity ($v_N$), and east velocity ($v_E$) and may be given by the following equations:

$$s = \begin{bmatrix} \psi \\ \theta \\ v_N \\ v_E \end{bmatrix} \tag{46}$$

$$q = \begin{bmatrix} \psi \\ \theta \end{bmatrix} \quad v = \begin{bmatrix} v_N \\ v_E \end{bmatrix} \quad s = \begin{bmatrix} q \\ v \end{bmatrix} \tag{47}$$

The state estimation error covariance matrix P is defined by:

$$P = E[(s-\hat{s})(s-\hat{s})^T] = \begin{bmatrix} P_q & P_{qv} \\ P_{vq} & P_v \end{bmatrix} \tag{48}$$

where E is the statistical expectation operator.

The measurement matrix H generally corresponds to a partial derivative of a measurement function with respect to geolocation and velocity. Thus, the measurement matrix H may be formed regardless of signal measurement type, such as AOA, DOA, FDOA, etc, provided a partial derivative may be formed from a measurement function. The expected value of the measurement, h($\hat{s}$), will be generally unique for each signal measurement type.

The measurement matrix, H, may be generally expressed as:

$$H = \frac{\partial h}{\partial s} = \begin{bmatrix} \frac{\partial h}{\partial q} & \frac{\partial h}{\partial v} \end{bmatrix} = \begin{bmatrix} \frac{\partial h}{\partial \hat{p}} & \frac{\partial \hat{p}}{\partial q} & \frac{\partial h}{\partial v} \end{bmatrix} \tag{49}$$

wherein p-hat and $\hat{p}$ are utilized interchangeably herein, p-hat is the ECEF position target vector computed using $\hat{s}$, as is discussed below in detail and q and v are defined by equation 47. The vectors $\partial h/\partial$p-hat and $\partial h/\partial v$ are unique for each measurement type and are discussed below in more detail. The 3×2 matrix $\partial$p-hat$/\partial q$ is the same for all measurement types and is computing utilizing the coordinate frame defined above:

$$\frac{\partial \hat{p}}{\partial q} = \begin{bmatrix} \frac{\partial \hat{p}}{\partial \psi} & \frac{\partial \hat{p}}{\partial \theta} \end{bmatrix} \tag{50}$$

$$\frac{\partial \hat{p}}{\partial \psi} = \begin{bmatrix} -(r_E + a)\sin(\psi)\cos(\theta) + \left(\frac{\partial r_E}{\partial \psi} + \frac{\partial a}{\partial \psi}\right)\cos(\psi)\cos(\theta) \\ (r_E + a)\cos(\psi)\cos(\theta) + \left(\frac{\partial r_E}{\partial \psi} + \frac{\partial a}{\partial \psi}\right)\sin(\psi)\cos(\theta) \\ \left(\frac{\partial r_E}{\partial \psi}(1-\varepsilon^2) + \frac{\partial a}{\partial \psi}\right)\sin(\theta) \end{bmatrix} \tag{51}$$

$$\frac{\partial \hat{p}}{\partial \theta} = \begin{bmatrix} -(r_E + a)\cos(\psi)\sin(\theta) + \left(\frac{\partial r_E}{\partial \theta} + \frac{\partial a}{\partial \theta}\right)\cos(\psi)\cos(\theta) \\ -(r_E + a)\sin(\psi)\sin(\theta) + \left(\frac{\partial r_E}{\partial \theta} + \frac{\partial a}{\partial \theta}\right)\sin(\psi)\cos(\theta) \\ (r_E(1-\varepsilon^2) + a)\cos(\theta) + \left(\frac{\partial r_E}{\partial \theta}(1-\varepsilon^2) + \frac{\partial a}{\partial \theta}\right)\sin(\theta) \end{bmatrix} \tag{52}$$

where $$\frac{\partial r_E}{\partial \psi} = 0 \quad \frac{\partial r_E}{\partial \theta} = \frac{r_E \varepsilon^2 \sin(\theta)\cos(\theta)}{1 - \varepsilon^2 \sin^2(\theta)} \tag{53}$$

as emitter altitude a is assumed to be constant:

$$\frac{\partial a}{\partial \psi} = \frac{\partial a}{\partial \theta} = 0 \tag{54}$$

As should be appreciated, in some embodiments emitter altitude need not be assumed as a constant, and the forgoing and following equations and steps may be modified accordingly to reflect varying emitter altitudes.

If the signal measurement acquired in step 100 is of DOA, TDOA, FDOA, or range, then z (the measurement as discussed above), h, and R (the variance of the error in z) are scalar. If the measurement is of position or velocity, then z and h are vectors, and R is a covariance matrix.

In embodiments where the signal measurement corresponds to DOA, equations 16 through 18, discussed above in detail, are utilized to provide the ∂h/∂p-hat vector. The desired velocity partial derivative, ∂h/∂v, is given by:

$$\frac{\partial h}{\partial v} = [0 \ 0] \tag{55}$$

In embodiments where the signal measurement corresponds to TDOA, equations 29 through 31, discussed above in detail, are utilized to provide the ∂h/∂p-hat position vector. The desired velocity partial derivative, ∂h/∂v, is given by:

$$\frac{\partial h}{\partial v} = [0 \ 0] \tag{56}$$

In embodiments where the signal measurement corresponds to FDOA, equations 32 through 34, discussed above in detail, are utilized to provide the ∂h/∂p-hat position vector. The desired velocity partial derivative, ∂h/∂v, is given by:

$$\frac{\partial h}{\partial v} = \left[\left(\frac{1}{r_1}\right)[\hat{p} - p_1] - \left(\frac{1}{r_2}\right)[\hat{p} - p_2]\right]^T \cdot TEL \cdot \begin{bmatrix} 1 & 0 \\ 0 & 1 \\ 0 & 0 \end{bmatrix} \tag{57}$$

wherein $r_1$ and $r_2$ are given by equation 29 and $p_1$ and $P_2$ are position vectors as discussed above in more detail.

In embodiments where the signal measurement corresponds to range, equations 35 and 36, discussed above in detail, are utilized to provide the ∂h/∂p-hat position vector. The desired velocity partial derivative, ∂h/∂v, is given by:

$$\frac{\partial h}{\partial v} = [0 \ 0] \tag{58}$$

In embodiments where the signal measurement corresponds to position, the position measurement will consist of emitter longitude and latitude measurements. Therefore, $$h(\hat{s}) = \begin{bmatrix} \hat{\psi} \\ \hat{\theta} \end{bmatrix} \tag{59}$$

$$H = \begin{bmatrix} 1 & 0 & 0 & 0 \\ 0 & 1 & 0 & 0 \end{bmatrix} \tag{60}$$

such that it is not necessary to compute either ∂h/∂p-hat or ∂h/∂v.

In embodiments where the signal measurement corresponds to velocity, the position measurement will consist of emitter north velocity and east velocity measurements. Therefore, $$h(\hat{s}) = \begin{bmatrix} \hat{v}_N \\ \hat{v}_E \end{bmatrix} \tag{61}$$

$$H = \begin{bmatrix} 0 & 0 & 1 & 0 \\ 0 & 0 & 0 & 1 \end{bmatrix} \tag{62}$$

such that it is not necessary to compute either ∂h/∂p-hat or ∂h/∂v.

In step 206, the measurement matrix H formed in step 204 is applied to the recursive filter to determine the geolocation and/or velocity of the signal. Specifically, the measurement matrix H may be utilized in combination with one or more of the above-equations to determine the geolocation and velocity of the signal emitter. As should be appreciated, the measurement matrix H may be applied to the recursive filter in innumerable configurations to compute the desired geolocation and velocity.

Due to its recursive nature, the recursive filter is preferably initialized utilizing an initial state vector ŝ and an initial covariance matrix P. The inital emitter location position estimate q̂ and covariance matrix $P_q$ can be acquired as described above in relation to steps 100-112. The initial emitter velocity estimate v̂ may be provided by a sensor or simply set to zero. The initial velocity estimation error covariance matrix $P_v$ can be constructed as a diagonal matrix based on the maximum expected emitter velocity. The matrices $P_{qv}$ and $P_{vq}$ can be set to zero. The initial vectors and matrices may be acquired or ascertained through any source, including by retrieval through the communications network 12 and/or by retrieval from another computing element or collector element.

However, the initial vectors and matrices may be computed utilizing the signal measurement acquired in step 200 and/or by utilizing additional signal measurements. As will be appreciated by those skilled in the art, initialization is not necessarily required in all embodiments as the present invention may function without first initializing the recursive filter. For instance, the recursive filter may be previously initialized, the initial covariance matrix may be retrieved from the memory 16 or through the communications network 16, and/or the initialization or initial covariance matrix may be computed utilizing other estimations and methods.

After initialization, the covariance matrix P is preferably computed as follows:

$$P = \Phi P \Phi^T + D \tag{63}$$

$$F = \frac{\partial \dot{s}}{\partial s} \tag{64}$$

$$= \begin{bmatrix} 0 & \frac{\sin(\theta)v_E}{\cos^2(\theta)(r_E + a)} & 0 & \frac{1}{\cos(\theta)(r_E + a)} \\ 0 & 0 & \frac{1}{r_N + a} & 0 \\ 0 & 0 & 0 & 0 \\ 0 & 0 & 0 & 0 \end{bmatrix}$$

wherein φ is a state transition matrix and D is a discrete process noise matrix. F is formed utilizing equations 43 through 45, discussed above in detail. The following illustrates the formation of φ and D:

$$G = \begin{bmatrix} 0 & 0 \\ 0 & 0 \\ 1 & 0 \\ 0 & 1 \end{bmatrix} \quad W = \begin{bmatrix} \sigma^2 & 0 \\ 0 & \sigma^2 \end{bmatrix} \quad (65)$$

$$A = \begin{bmatrix} -F & GWG^T \\ 0_{4 \times 4} & F^T \end{bmatrix} \cdot \Delta t$$

$$B = \sum_{k=0}^{5} \left(\frac{1}{k!}\right) A^k$$

$$\Phi = B(5:8, 5:8)^T \qquad D = \Phi \cdot B(1:4, 5:8)$$

wherein $\Delta t$ is the time since the last update and $\sigma$ is a process noise tuning parameter which may be used to account for any unmodeled emitter acceleration.

Before application of the measurement matrix H to the recursive filter, the state vector s is preferably propagated utilizing Euler integration of the rates given by equation 43-44:

$$\psi = \psi + \dot{\psi} \cdot \Delta t$$

$$\theta = \theta + \dot{\theta} \cdot \Delta t$$

$$v_N = v_N$$

$$v_E = v_E \qquad (66)$$

The updated emitter ECEF position vector p-hat is computed as discussed above and the updated estimated emitter ECEF velocity vector is computed as follows:

$$\hat{p} = TEL \cdot \begin{bmatrix} v_N \\ v_E \\ 0 \end{bmatrix} \qquad (67)$$

The measurement matrix H and/or the expected measurement value $h(\hat{s})$ formed in step 204 are applied to the state vector measurement update, $\hat{s}_{new}$ and the covariance measurement update $P_{new}$ to determine the geolocation and velocity of the signal emitter. $\hat{s}_{new}$ and $P_{new}$ may be represented as:

$$K = PH^T[HPH^T + R]^{-1} \qquad (68)$$

$$\hat{s}_{new} = \hat{s} + K[z - h(\hat{s})] \qquad (69)$$

$$P_{new} = [I-KH]P[I-KH]^T + KRK^T \qquad (70)$$

wherein I is a 4×4 identity matrix, R is the variance of the error in measurement z (R is equivalent to $\sigma^2$ of step 104), K is the Kalman gain matrix, and updated target longitude ($\psi$), latitude ($\theta$), north velocity ($v_N$), and east velocity ($v_E$) may be acquired from $\hat{s}_{new}$ utilizing equation (46). Target altitude may be acquired as discussed above regarding steps 100-112, such as by utilizing a DTED look-up table to retrieve target altitude utilizing its longitude and latitude. However, in some embodiments, target altitude need not be determined.

The determined geolocation (longitude and latitude) and velocity (north and east velocity) may be stored in the memory 16 for utilization by the processor 14, provided to other elements through the communications network 12, and/or be displayed or otherwise indicated to a user.

Step 208 is generally similar to step 108 discussed above. In step 208, a second signal measurement is acquired. The second signal measurement corresponds to the signal related to the first signal measurement and may be acquired in a similar or identical manner to the first signal measurement acquired in step 200. Additionally, the second signal measurement may be acquired generally simultaneously or concurrently with the first signal measurement such that acquisition of the second signal measurement need not occur at a later time than the first signal measurement. However, the second signal measurement may be acquired at any time, before, concurrently with, or after the first signal measurement.

The second signal measurement may include any signal measurement type, such as AOA, DOA, FDOA, TDOA, etc, and not be limited to any particular measurement type. As a result, the first and second signal measurement may correspond to any combination of signal measurement types. The second signal measurement may also be provided by a device or system independent from the device or system utilized to acquire the first signal measurement. For instance, the first signal measurement may be a first measurement type acquired from a first collector element and the second signal measurement may be a second measurement type, different than the first, acquired from a second collector element, unrelated to the first collector element. Such functionality enables the present invention to be universally utilized to determine geolocations and velocities without requiring any specific system configuration or measurement types.

In step 210, a second measurement matrix is formed utilizing the second signal measurement. The second measurement matrix is formed in a similar or identical manner to the first measurement matrix H as described above in step 204, with the exception that the second signal measurement is utilized to form the second measurement matrix instead of the first measurement matrix. Thus, the first and second measurements matrix may be similar when the first and second signal measurement are similar, such as when the signal measurements both correspond to DOA, or the measurement matrices may be different when the signal measurements are of different types, such as DOA and TDOA.

The second measurement matrix may be formed at any time after or concurrently with acquisition of the second signal measurement in step 208. Similarly, the second measurement matrix may be formed before, concurrently with, or after formation of the first measurement matrix of step 204. Thus, step 210 does not necessarily occur after step 204.

Additionally, in various embodiments step 210 may also include ascertaining the validity of the second signal measurement. The validity of the second signal measurement may be ascertained in a similar or identical manner to the manner in which the validity of the first signal measurement is ascertained in step 202. Should the second signal measurement be ascertained as invalid, step 208 may be repeated to acquire a valid or more valid signal measurement, while if the second signal measurement is valid, step 210 may be performed to generate the second measurement matrix.

In step 212, the second measurement matrix formed in step 210 is applied to the recursive filter to update the determined geolocation and velocity. Step 212 may be substantially similar or identical to step 206 with the exception that the second measurement matrix is applied to the recursive filter instead of the first measurement matrix. Thus, the second measurement matrix and/or the expected measurement value $h(\hat{s})$ formed in step 210 are applied to the state vector measurement update, $\hat{s}_{new}$ and the covariance measurement update $P_{new}$, defined above, to determine the geolocation and/or velocity of the emitted signal.

As should be appreciated, step 212 is operable to update the geolocation and velocity determined in step 206 without requiring batch-processing or other memory-intensive methods as all that is required by the present invention to determine and/or update the geolocation and velocity is storage of the state vector $\hat{s}$ and the covariance matrix P.

Thus, the present invention need not store previously determined signal measurements and it is operable to continuously update the determined geolocation and velocity over any period of time simply by acquiring a signal measurement, forming a measurement matrix, and applying the measurement matrix to the recursive filter.

Such a configuration also enables the present invention to accurately and continuously provide updated geolocations and velocities utilizing a single signal measurement as additional measurements may be utilized at any time to refresh the determined geolocation and velocity. Thus, the present invention does not require a pair of signals or other complex data to determine or update the geolocation and velocity.

Although the invention has been described with reference to the preferred embodiment illustrated in the attached drawing figures, it is noted that equivalents may be employed and substitutions made herein without departing from the scope of the invention as recited in the claims. For example, each of the various equations provided herein may be replaced or substituted with innumerable variations and general equivalents. For instance, the equations disclosed above relating to Kalman filters and WGS84 coordinates may be substituted for other equations corresponding to other filters and coordinates by those skilled in the art.

Having thus described the preferred embodiment of the invention, what is claimed as new and desired to be protected by Letters Patent includes the following:

1. A method for determining a geolocation and a velocity of a moving non-cooperative target, the method comprising:
   acquiring with a first collector a first signal measurement corresponding to a signal emitted from an emitter on the target, the first collector being capable of acquiring each and every one of a first angle of arrival signal measurement, a first direction of arrival signal measurement, a first target range signal measurement, a first position signal measurement, and a first velocity signal measurement;
   forming a first measurement matrix utilizing the first acquired signal measurement;
   applying the measurement matrix to a recursive filter;
   acquiring with a second collector a second signal measurement corresponding to a signal emitted from the emitter on the target, the second collector being capable of acquiring each and every one of a second angle of arrival signal measurement, a second direction of arrival signal measurement, a second target range signal measurement, a second position signal measurement, and a second velocity signal measurement;
   forming a second measurement matrix utilizing the second acquired signal measurement; and
   applying the second measurement matrix to the recursive filter to determine the geolocation and the velocity of the target without receiving or requiring a precise location or orientation of the target from a communication transmitted from the target.

2. The method of claim 1, wherein the recursive filter corresponds to a Kalman filter.

3. The method of claim 1, wherein the determined geolocation includes a latitude, a longitude, and an altitude.

4. The method of claim 1, wherein the determined geolocation corresponds to the World Geodetic System of 1984 earth model.

5. The method of claim 1, further including ascertaining the validity of the first and second acquired signal measurements.

6. The method of claim 1, wherein the recursive filter includes a state vector and a covariance matrix that are operable to be utilized to determine the geolocation and the velocity utilizing the measurement matrix.

7. The method of claim 1, wherein the first collector and second collector are independent from one another.

8. The method of claim 1, further including the steps of acquiring additional signal measurements; forming additional measurement matrices with the additional signal measurements; and applying the additional measurement matrices to the recursive filter to update the geolocation and the velocity of the target.

9. A method for determining a geolocation and a velocity of a moving non-cooperative target, the method comprising:
   initializing a recursive filter with data corresponding to an initial geolocation and an initial velocity of the target, the data being received from a source other than the target;
   acquiring with a first collector a first signal measurement corresponding to a signal emitted from an emitter on the target, the first collector being capable of acquiring each and every one of a first angle of arrival signal measurement, a first direction of arrival signal measurement, a first target range signal measurement, a first position signal measurement, and a first velocity signal measurement;
   forming a first measurement matrix utilizing the first acquired signal measurement;
   applying the measurement matrix to the recursive filter to determine an updated geolocation and velocity of the target without receiving or requiring location or orientation information from the target;
   acquiring with a second collector a second signal measurement corresponding to a signal emitted from the emitter on the target, the second collector being capable of acquiring each and every one of a second angle of arrival signal measurement, a second direction of arrival signal measurement, a second target range signal measurement, a second position signal measurement, and a second velocity signal measurement;
   forming a second measurement matrix utilizing the second acquired signal measurement; and
   applying the second measurement matrix to the recursive filter to further update the geolocation and the velocity of the target without receiving or requiring a precise location or orientation of the target from a communication transmitted from the target.

10. The method of claim 9, wherein the recursive filter corresponds to a Kalman filter.

11. The method of claim 9, wherein the determined geolocation includes a latitude, a longitude, and an altitude.

12. The method of claim 9, wherein the determined geolocation corresponds to the World Geodetic System of 1984 earth model.

13. The method of claim 9, further including ascertaining the validity of the first and second acquired signal measurements.

14. The method of claim 9, wherein the recursive filter includes a state vector and a covariance matrix that are operable to be utilized to determine the geolocation and the velocity utilizing the measurement matrix.

15. The method of claim 9, wherein the first collector and second collector are independent from one another.

16. The method of claim 9, further including the steps of acquiring additional signal measurements; forming additional measurement matrices with the additional signal measurements; and applying the additional measurement matrices to the recursive filter to update the geolocation and the velocity of the target.

17. A method for determining a geolocation and a velocity of a moving non-cooperative target, the method comprising:

acquiring with a first collector a first signal measurement corresponding to a signal emitted from an emitter on the target, the first collector being capable of acquiring each of a first time of arrival signal measurement and a first frequency of arrival signal measurement;

simultaneously acquiring with a second collector a second signal measurement corresponding to a signal emitted from the emitter on the target, the second collector being capable of acquiring each of a second time of arrival signal measurement or a second frequency of arrival signal measurement;

combining the first and second signal measurements to form a measurement of time difference of arrival and frequency difference of arrival;

forming a measurement matrix utilizing the time difference of arrival and frequency difference of arrival measurement; and applying the measurement matrix to a recursive filter to determine the geolocation and the velocity of the target without receiving or requiring a precise location or orientation of the target from a communication transmitted from the target.

18. The method of claim 17, wherein the recursive filter corresponds to a Kalman filter.

19. The method of claim 17, wherein the determined geolocation includes a latitude, a longitude, and an altitude.

20. The method of claim 17, wherein the determined geolocation corresponds to the World Geodetic System of 1984 earth model.

21. The method of claim 17, further including ascertaining the validity of the first and second acquired signal measurements.

22. The method of claim 17, wherein the recursive filter includes a state vector and a covariance matrix that are operable to be utilized to determine the geolocation and the velocity utilizing the measurement matrix.

23. The method of claim 17, wherein the first collector and second collector are independent from one another.

24. The method of claim 17, further including the steps of acquiring additional signal measurements; forming additional measurement matrices with the additional signal measurements; and applying the additional measurement matrices to the recursive filter to update the geolocation and the velocity of the target.

* * * * *